3,044,970
PROCESS OF EXPANDING POLYMERS OF UNSATURATED ESTERS OF TERTIARY BUTYL ALCOHOL AND FOAMABLE PRODUCT OBTAINED THEREFROM

Wilhelm Baumeister, Heidelberg, and Rudolf Gaeth, Erich Haarer, and Adolf Schwarz, Ludwigshafen (Rhine), Germany, assignors to Badische Anilin- & Soda-Fabrik Aktiengesellschaft, Ludwigshafen (Rhine), Germany
No Drawing. Filed June 3, 1960, Ser. No. 33,648
Claims priority, application Germany July 30, 1957
9 Claims. (Cl. 260—2.5)

This invention relates to a process for the production of porous plastics from polymers of unsaturated esters of tertiary butyl alcohol.

Various methods are known for the production of porous plastics which have achieved industrial importance in recent years. In one method which is widely used in industry, an aqueous solution of a hardenable condensation product is converted, after adding an emulsifying agent, into a foam which is then cured. Another method, which is suitable for working up hardenable and thermoplastic materials, makes use of the addition of compounds which split off gas when heated, such as carbonates or azo compounds, in order to expand the plastic which has been softened by heat.

Readily volatile liquids and gases have proved suitable in practice as blowing agents for expanding thermoplastic materials, especially polystyrene.

In the case of porous plastics on the basis of polyurethanes, the reaction for the formation of the polyurethanes proceeds with the splitting off of carbon dioxide so that the addition of a separate blowing agent is not as a rule necessary.

In the case of thermoplastic synthetic polymers there has been no lack of attempts to bring about an expansion of the plastic without the use of separate low molecular weight blowing agents, but hitherto it has not been possible to introduce any of these methods into industry because they are attended by considerable defects. Thus for example it is known that by heating polymeric esters of chloracrylic acid, hydrogen chloride is split off and that this can be used for expanding the softened plastic mass. The strongly corrosive hydrogen chloride, however, is undesirable as a blowing agent. In the further known decomposition of polymethacrylic acid methyl ester, polymethacrylic acid and polyvinyl acetate, which proceed with the formation of bubbles, there are formed only products of relatively high specific gravity which are without importance in practice.

The object of the present invention is to provide a process for the production of porous plastics without the addition of low molecular weight blowing agents. A further object is to provide a process by which it is possible to produce porous masses of low specific gravity by heating plastics which decompose with the formation of gas. Other objects and advantages of the invention will be apparent from the following description of the invention.

The objects are achieved by heating a polymer of tertiary butyl acrylic or methacrylic acid ester to a temperature above about 125° C. under a pressure sufficient to prevent the said polymer expanding, whereby the said polymer is decomposed and isobutylene is split off; cooling the said polymer to a temperature below its softening point while maintaining a pressure sufficient to prevent the said polymer expanding; and thereafter heating the said polymer to a temperature above its softening point at a pressure of from 1 to 4 atmospheres.

For the production of porous plastics according to this invention there may be used homopolymers of tertiary butyl acrylic or methacrylic ester i.e., compounds of the general formula $CH_2=CR-CO_2C(CH_3)_3$ in which R is hydrogen or a methyl group or copolymers from at least 5 percent by weight of tertiary butyl acrylic esters and compounds capable of being copolymerized with the said tertiary butyl acrylic esters. The monomers may be polymerized in emulsion, solution or suspension. Mass polymerization methods may also be used if provision is made that the decomposition temperature of the monomeric and/or polymeric tertiary acrylic acid esters is not exceeded.

Halogen-containing vinyl compounds, such as vinyl chloride and vinylidene chloride, are of special interest for copolymerization with tertiary butyl acrylic esters. For example copolymers of 50 to 95% by weight of vinyl chloride and 50 to 5% by weight of tertiary butyl acrylic acid ester are valuable initial materials for the present process. Other suitable co-monomers include styrene, vinyl acetate and acrylonitrile. Mixtures of homopolymers or copolymers of tertiary butyl acrylic acid ester with each other or with other plastics, as for example polyvinyl chloride, polyvinylidene chloride, polyisobutylene and the like, may also be used. The addition of plasticizers or rubberlike compounds is also possible. Moreover, small amounts of bifunctional monomers, such as divinylbenzene, may be incorporated in the polymers of unsaturated esters of tertiary butyl alcohol, whereby slightly crosslinked but still thermoplastic products are formed which have a somewhat higher softening point than the polymers which are not crosslinked.

In the process of this invention the first step comprises heating the tertiary butylester polymer under pressure at temperatures above about 125° C., at which temperature isobutylene begins to split off from the polymer. The most suitable temperatures for decomposing the polymer lie in the range of from 140 to 170° C. Temperatures up to 190° C. may also be applied. Application of pressure is necessary in order to retain and homogeneously distribute the isobutylene in the polymer. Decomposing the polymer without pressure yields a cracked mass incorporating a number of large bubbles. The polymer may be heated and pressed in presses of conventional design. The pressure applied should be sufficient to prevent the polymer expanding. The pressure to be applied depends on the polymer used and the heating temperature and generally varies between 150 and 400 atmospheres. After the polymer is decomposed and isobutylene is split off it is cooled to a temperature below its softening point while maintaining a pressure sufficient to prevent the polymer expanding. This procedure yields expandable polymers which contain as expanding agent isobutylene in homogeneous distribution and which may be expanded by further heating to a temperature above their softening point. The softening points vary from one polymer to another and generally lie between 50 and 120° C. Expansion is preferably carried out at the softening point or at a temperature up to 50° C. above the softening point.

In order to prepare shaped porous articles from the expandable polymers a blank may be produced and this then expanded with or without the use of a mold. A process in which the expandable plastic is granulated and then expanded in a mold which when closed is not gastight is of special interest for the production of porous shaped articles. The amount of the plastic to be expanded and the volume of the mold are so correlated that the plastic exerts during the expansion a slightly increased pressure on the inside of the wall of the mold. In this way the individual grains of plastic sinter or cohere during the expansion and form a shaped article which is dimensionally stable.

It is also possible to modify this method of operation by first pre-expanding the granular expandable plastic mass without sintering, and then filling a mold as fully as possible with these pre-expanded grains which are then sintered together by complete expansion.

The necessary heat may be supplied in various ways to the plastic to be expanded, for example by steam, by hot non-solvent liquids, by infra-red radiation or by high-frequency heating. As a rule the plastic is expanded in this process at atmospheric pressure. However, in the process of expanding and sintering a granulated mass of expandable plastic, for example, increased pressure, e.g., 1 to 3 atmospheres may be applied.

The porous plastics prepared according to the present invention may be used to good effect in various fields of industry. Thus for example they may be used as insulating materials against heat, cold and sound. The new porous plastics may also be used in other fields in which it is known that porous masses may be used.

The following examples will further illustrate this invention but the invention is not restricted to these examples. The parts specified are parts by weight.

*Example 1*

An emulsion copolymer having the K-value 62 according to Fikentscher and derived from 90 parts of vinyl chloride and 10 parts of tertiary butyl acrylate is pressed into a plate at 150° C. and then granulated. A mold which is closable in a non-gastight manner and which may be perforated is filled to about one-fifth of its capacity with the said granulate and heated for 15 minutes at 140° C. After cooling there is obtained a porous shaped article of the specific gravity 0.02.

*Example 2*

An emulsion copolymer derived from 70 parts of vinyl chloride and 30 parts of tertiary butyl acrylate is pressed at 140° C. to form a plate. After storage for 20 minutes in a heating cabinet at 120° to 125° C., a porous plate of the specific gravity 0.02 is obtained.

This application is a continuation-in-part of our application Serial No. 751,642, filed July 29, 1958, now abandoned.

We claim:

1. A process for the production of porous plastics which comprises: heating a polymer of a compound having the general formula $CH_2=CR—CO_2C(CH_3)_3$, in which R is a member selected from the group consisting of hydrogen and a methyl group, to a temperature of from about 125° C. to about 190° C. under a pressure sufficient to prevent said polymer expanding, whereby said polymer is decomposed and isobutylene is split off, and whereby said isobutylene is homogeneously distributed throughout said polymer; cooling said polymer to a temperature below its softening point while maintaining a pressure sufficient to prevent said polymer from expanding, and thereby obtaining an expandable polymer containing isobutylene; and thereafter heating said polymer to a temperature from its softening point up to about 50° above its softening point at a pressure of from 1 to 4 atmospheres, whereby the isobutylene is released and a porous product is obtained.

2. A process for the production of porous plastics which comprises: heating a copolymer of at least 5 percent by weight of a compound having the general formula $CH_2=CR—CO_2C(CH_3)_3$, in which R is a member selected from the group consisting of hydrogen and a methyl group, and up to 95 percent by weight of an ethylenically unsaturated compound capable of being copolymerized with said compound of the general formula $$CH_2=CR—CO_2C(CH_3)_3$$

to a temperature of from about 125° C. to about 190° C. under a pressure sufficient to prevent said copolymer expanding, whereby said copolymer is decomposed and isobutylene is split off, and whereby said isobutylene is homogeneously distributed throughout said polymer; cooling said copolymer to a temperature below its softening point while maintaining a pressure sufficient to prevent said copolymer from expanding, and thereby obtaining an expandable polymer containing isobutylene; and thereafter heating said copolymer to a temperature from its softening point up to about 50° above its softening point at a pressure of from 1 to 4 atmospheres, whereby the isobutylene is released and a porous product is obtained.

3. A process for the production of porous plastics which comprises: heating a copolymer derived from 50 to 95 percent by weight of vinyl chloride and 50 to 5 percent by weight of tertiary butyl acrylate, to a temperature of from about 125° C. to about 190° C. under a pressure sufficient to prevent said copolymer expanding, whereby said copolymer is decomposed and isobutylene is split off, and whereby said isobutylene is homogeneously distributed throughout said polymer; cooling said copolymer to a temperature below its softening point while maintaining a pressure sufficient to prevent said copolymer from expanding, and thereby obtaining an expandable polymer containing isobutylene; and thereafter heating said copolymer to a temperature from its softening point up to about 50° above its softening point at a pressure of from 1 to 4 atmospheres, whereby the isobutylene is released and a porous product is obtained.

4. A process for the production of porous plastics which comprises: heating a polymer of a compound having the general formula $CH_2=CR—CO_2C(CH_3)_3$, in which R is a member selected from the group consisting of hydrogen and a methyl group, to a temperature of from about 140° C. to about 170° C. under a pressure sufficient to prevent said polymer expanding, whereby said polymer is decomposed and isobutylene is split off, and whereby said isobutylene is homogeneously distributed throughout said polymer; cooling said polymer to a temperature below its softening point while maintaining a pressure sufficient to prevent said polymer from expanding, and thereby obtaining an expandable polymer containing isobutylene; and thereafter heating said polymer to a temperature from its softening point up to about 50° above its softening point at a pressure of from 1 to 4 atmospheres, whereby said isobutylene is released and a porous product is obtained.

5. A process for the production of porous plastics which comprises: heating a copolymer of at least 5 percent by weight of a compound having the general formula $CH_2=CR—CO_2C(CH_3)_3$, in which R is a member selected from the group consisting of hydrogen and a methyl group, and up to 95 percent by weight of an ethylenically unsaturated compound capable of being copolymerized with said compound of the general formula $$CH_2=CR—CO_2C(CH_3)_3$$

to a temperature of from about 140° C. to about 170° C. under a pressure sufficient to prevent said copolymer expanding, whereby said copolymer is decomposed and isobutylene is split off, and whereby said isobutylene is homogeneously distributed throughout said copolymer; cooling said copolymer to a temperature below its softening point while maintaining a pressure sufficient to prevent said copolymer from expanding, and thereby obtaining an expendable copolymer containing isobutylene; and thereafter heating said copolymer to a temperature from its softening point up to about 50° above its softening point at a pressure of from 1 to 4 atmospheres, whereby the isobutylene is released and a porous product is obtained.

6. A process for the production of porous plastics which comprises: heating a copolymer derived from 50 to 95 percent by weight of vinyl chloride and 50 to 5 percent by weight of tertiary butyl acrylate, to a temperature of from about 140° C. to about 170° C. under a pressure sufficient to prevent said copolymer expanding, whereby said copolymer is decomposed and isobutylene is split off, and whereby said isobutylene is homogeneously distributed throughout said copolymer; cooling said copolymer to a temperature below its softening point while maintaining a pressure sufficient to prevent said copolymer from expanding, and thereby obtaining an expandable copolymer containing isobutylene; and thereafter heating said copolymer to a temperature from above its softening point up to about 50° above its softening point at a pressure of from 1 to 4 atmospheres, whereby the isobutylene is released and a porous product is obtained.

7. An expandable polymer containing isobutylene homogeneously dispersed therein, said expandable polymer being formed from a polymer of a compound having the general formula $CH_2=CR-CO_2C(CH_3)_3$, in which R is a member selected from the group consisting of hydrogen and a methyl group by heating said polymer to a temperature of from about 125° C. to about 190° C. under a pressure sufficient to prevent said polymer from expanding, whereby said polymer is decomposed and isobutylene is split off, and whereby said isobutylene is homogeneously distributed throughout said polymer; and by thereafter cooling said polymer to a temperature below its softening point while maintaining a pressure sufficient to prevent said polymer from expanding, whereby an expandable polymer is formed containing isobutylene.

8. An expandable copolymer containing isobutylene homogeneously dispersed therein, said expandable copolymer being formed from a copolymer of at least 5 percent by weight of a compound having the general formula $CH_2=CR-CO_2C(CH_3)_3$, in which R is a member selected from the group consisting of hydrogen and a methyl group by heating said copolymer to a temperature of from about 125° C. to about 190° C. under a pressure sufficient to prevent said copolymer from expanding, whereby said copolymer is decomposed and isobutylene is split off, and whereby said isobutylene is homogeneously distributed throughout said copolymer; and by thereafter cooling said copolymer to a temperature below its softening point while maintaining a pressure sufficient to prevent said copolymer from expanding, whereby an expandable copolymer is formed containing isobutylene.

9. An expandable copolymer containing isobutylene homogeneously dispersed therein, said expandable copolymer being formed from a copolymer derived from 50 to 95 percent by weight of vinyl chloride and 50 to 5 percent by weight of tertiary butyl acrylate by heating said copolymer to a temperature of from about 125° C. to about 190° C. under a pressure sufficient to prevent said copolymer from expanding, whereby said copolymer is decomposed and isobutylene is split off, and whereby said isobutylene is homogeneously distributed throughout said copolymer; and by thereafter cooling said copolymer to a temperature below its softening point while maintaining a pressure sufficient to prevent said copolymer from expanding, whereby an expandable copolymer is formed containing isobutylene.

References Cited in the file of this patent
UNITED STATES PATENTS

| | | |
|---|---|---|
| 2,297,248 | Rudolph | Sept. 29, 1942 |
| 2,972,170 | Birchhead et al. | Feb. 21, 1961 |

UNITED STATES PATENT OFFICE

CERTIFICATE OF CORRECTION

Patent No. 3,044,970                                    July 17, 1962

Wilhelm Baumeister et al.

It is hereby certified that error appears in the above numbered patent requiring correction and that the said Letters Patent should read as corrected below.

Column 4, line 60, for "expendable" read -- expandable --.

Signed and sealed this 20th day of November 1962.

(SEAL)
Attest:

ERNEST W. SWIDER                                   DAVID L. LADD
Attesting Officer                                      Commissioner of Patents